(12) United States Patent
Pistorius et al.

(10) Patent No.: US 9,292,474 B1
(45) Date of Patent: Mar. 22, 2016

(54) CONFIGURABLE HYBRID ADDER CIRCUITRY

(71) Applicant: Altera Corporation, San Jose, CA (US)

(72) Inventors: Erhard Joachim Pistorius, Mountain View, CA (US); Michael D. Hutton, Mountain View, CA (US)

(73) Assignee: Altera Corporation, San Jose, CA (US)

( * ) Notice: Subject to any disclaimer, the term of this patent is extended or adjusted under 35 U.S.C. 154(b) by 308 days.

(21) Appl. No.: 13/957,113

(22) Filed: Aug. 1, 2013

Related U.S. Application Data

(62) Division of application No. 12/111,156, filed on Apr. 28, 2008, now Pat. No. 8,521,801.

(51) Int. Cl.
*G06F 7/50* (2006.01)
*G06F 17/10* (2006.01)

(52) U.S. Cl.
CPC ...................................... *G06F 17/10* (2013.01)

(58) Field of Classification Search
USPC .......................................................... 708/714
See application file for complete search history.

(56) References Cited

U.S. PATENT DOCUMENTS

| | | | |
|---|---|---|---|
| 3,993,891 A | 11/1976 | Beck et al. | |
| 4,764,886 A | 8/1988 | Yano | |
| 5,877,973 A | 3/1999 | Kato et al. | |
| 6,832,235 B1 * | 12/2004 | Muramatsu et al. | 708/710 |
| 6,961,741 B2 | 11/2005 | Swami | |
| 7,003,545 B1 | 2/2006 | Mohammed et al. | |
| 7,164,290 B2 | 1/2007 | Schlacter | |
| 7,185,043 B2 * | 2/2007 | Rarick | 708/710 |
| 7,349,938 B2 | 3/2008 | Chirca et al. | |
| 7,509,368 B2 | 3/2009 | Anders et al. | |
| 7,523,153 B2 * | 4/2009 | Goyal | 708/714 |
| 7,725,512 B1 | 5/2010 | Bain | |
| 7,908,308 B2 * | 3/2011 | Haller et al. | 708/714 |
| 8,117,247 B1 | 2/2012 | Taylor | |

OTHER PUBLICATIONS

Brent et al. "A Regular Layout for Parallel Adders", IEEE Trans. on Computers 31, pp. 260-264, Mar. 1982.
"Logic Array Blocks and Adaptive Logic Modules in Stratix III Devices", Stratix III Device Handbook, vol. 1, Chapter 2, Altera Corporation, Oct. 2007.
"Stratix Architecture", Stratix Device Handbook, vol. 1, Chapter 2, Altera Corporation, Jul. 2005.

* cited by examiner

*Primary Examiner* — Tan V. Mai
(74) *Attorney, Agent, or Firm* — Treyz Law Group; Jason Tsai

(57) ABSTRACT

Hybrid adder circuitry is provided for integrated circuits such as programmable integrated circuits. The hybrid adder may combine the capabilities of multiple adder architectures. Hybrid adders may include carry select and carry ripple adder circuits. The adder circuits may be combined using a carry look-ahead architecture. Adder functionality may be implemented using the resources of logic regions on the programmable integrated circuits. Each logic region may include combinatorial logic such as look-up table logic and register circuitry. The hybrid adder circuitry may receive input words to be added from the combinatorial circuitry and may produce corresponding arithmetic sum output signals to the register circuitry.

20 Claims, 20 Drawing Sheets

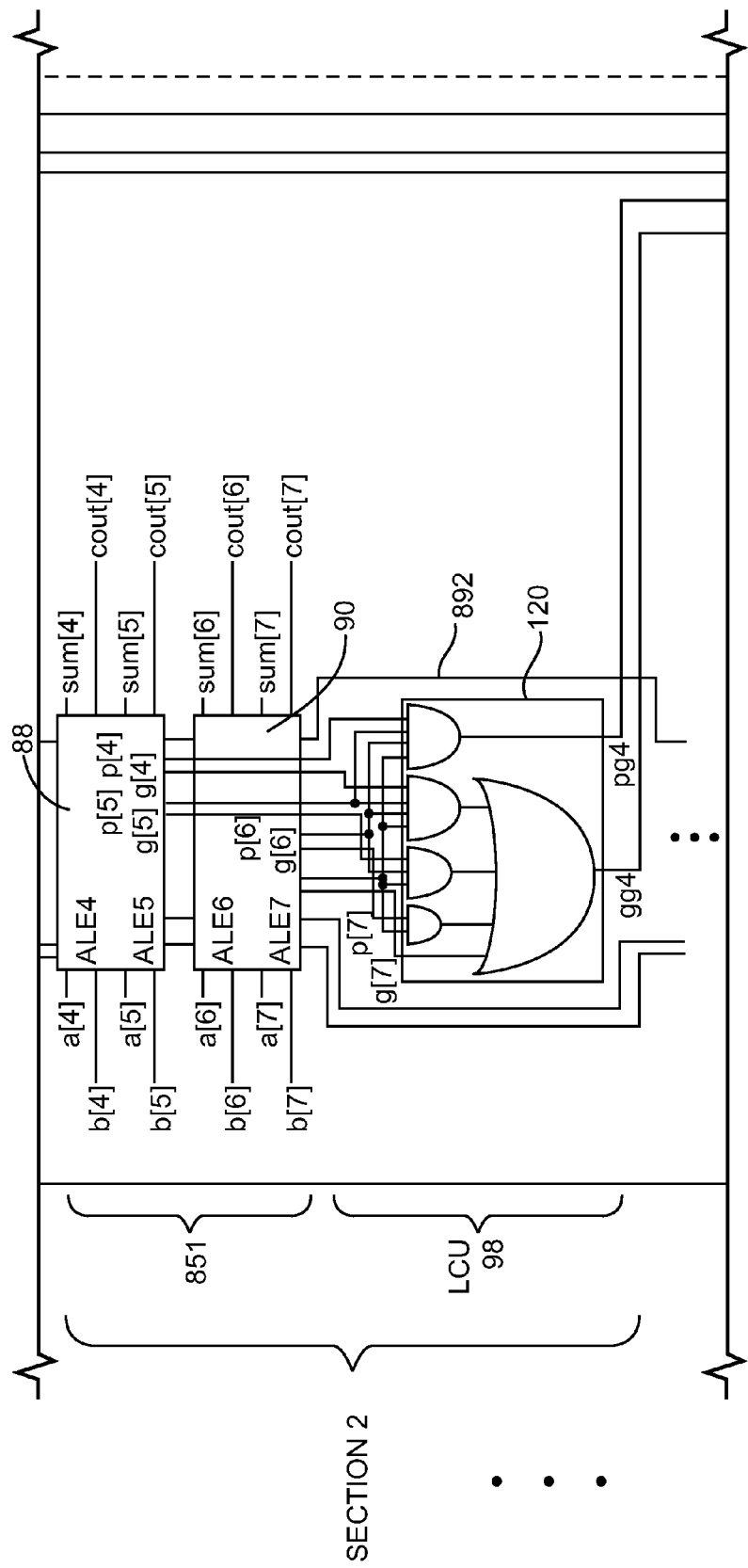
FIG. 8 (cont. 1)

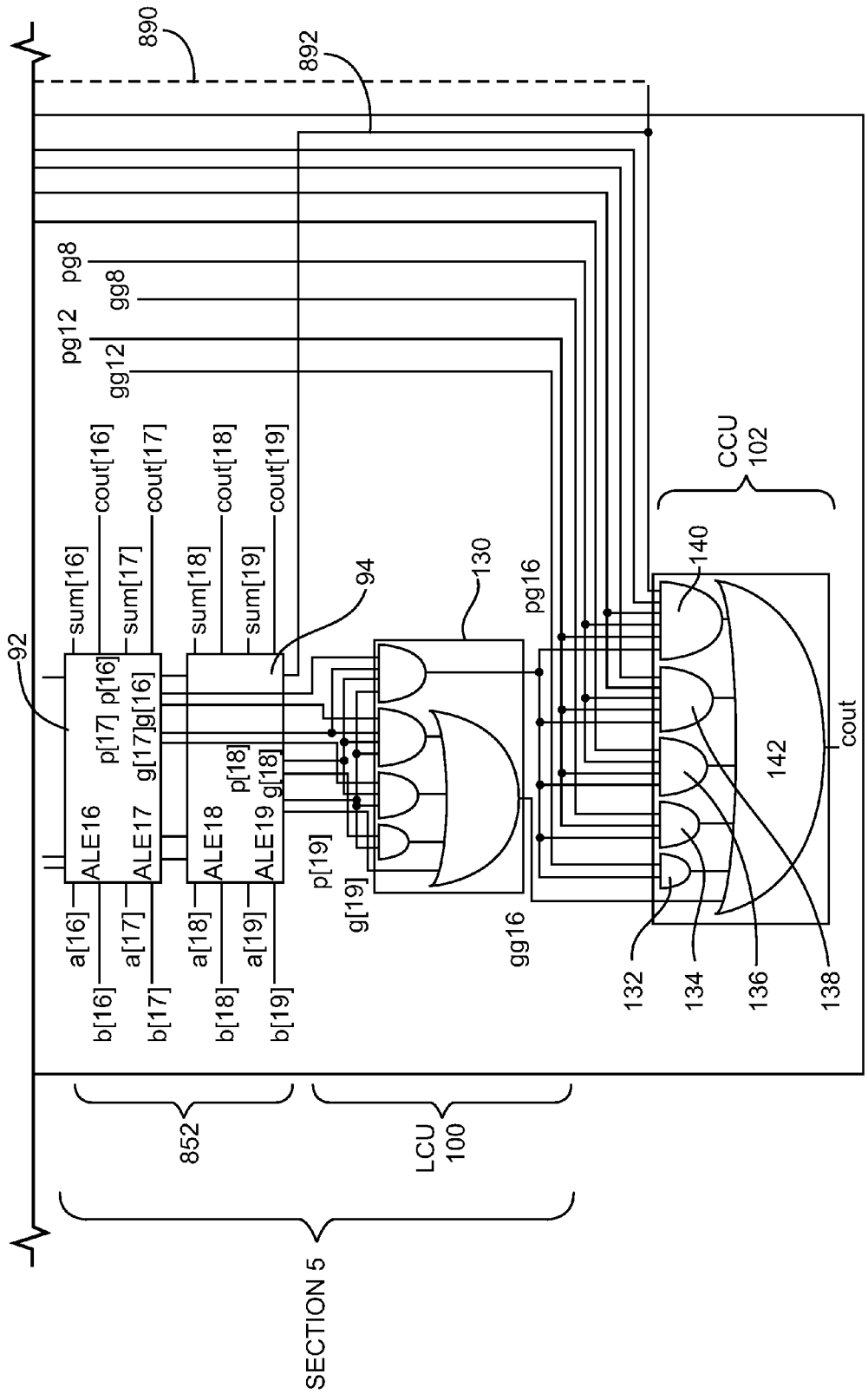
FIG. 8 (cont. 2)

CONFIGURABLE HYBRID ADDER CIRCUITRY

This application is a division of patent application Ser. No. 12/111,156, filed Apr. 28, 2008, which is hereby incorporated by reference herein in its entirety.

BACKGROUND

This invention relates to adders, and more particularly, to configurable hybrid adders for programmable integrated circuits.

Adders are used to perform binary addition in digital integrated circuits. For example, a five bit adder may be used to compute a binary sum of two five bit binary inputs.

Adders are widely used on integrated circuits such as programmable logic devices. Programmable logic device integrated circuits contain programmable logic that may be programmed to implement a desired custom logic design. In some device architectures, programmable logic is organized in regions. Each logic region may contain configurable adder circuits. When a logic designer desires to implement an adder that is larger than an individual adder circuit, the circuitry on the programmable logic device can be selectively configured to combine multiple adder circuits.

With conventional adder architectures, the larger adders that are formed in this way may exhibit undesirably long delay times or may be insufficiently flexible to accommodate commonly desired adder widths. For example, conventional ripple carry adders may be combined by forming a carry chain. During operation, a carry signal ripples through multiple adder stages in the chain in series. This type of architecture can be used when forming adders of different desired widths on a programmable logic device, but results in delay times that scale linearly with the number of bits in the adder. Other adder architectures such as the carry look ahead adder architecture have been developed that perform addition more rapidly than ripple carry adders. However, these adder architectures are generally not as flexible as ripple carry architectures and have therefore not been used in configurable adder circuits on conventional programmable logic devices.

It would therefore be desirable to be able to provide improved adder circuitry for integrated circuits such as programmable logic device integrated circuits.

SUMMARY

In accordance with the present invention, configurable hybrid adder circuitry may be provided on an integrated circuit such as a programmable integrated circuit. The programmable integrated circuit may be organized in an architecture having blocks of logic and regions of logic within the blocks of logic. Each block of logic may contain hybrid adder circuitry.

The hybrid adder circuitry may use a carry look-ahead architecture. In the carry look-ahead architecture, adders produce propagate and generate signals that are processed using carry look-ahead units. The carry look-ahead units produce output signals that are processed by a carry computation unit. The carry computation unit produces a corresponding carry out signal that forms part of the arithmetic sum for the adder circuit during addition operations on input words.

The adders in the hybrid adder circuitry may be formed using adders such as ripple carry adders and carry select adders. The ripple carry adders may be formed from chains of individual adder circuits. The carry select adders may include output selection multiplexers. Each slice in a carry select adder may include three half adders for producing propagate and generate signals and for producing sum and carry signals. The last slice of carry select adder circuitry may be used to route the carry output signal from a preceding slice to the output of the carry select adder for use as its most significant sum bit.

Further features of the invention, its nature and various advantages will be more apparent from the accompanying drawings and the following detailed description of the preferred embodiments.

DETAILED DESCRIPTION

The present invention relates to hybrid adder circuits. The hybrid adder circuits may be configurable and may be implemented on an integrated circuit such as a programmable integrated circuit. When an adder of a particular width is needed to implement a desired logic function, the resources of multiple adders can be combined to form an adder with the required width. By using a hybrid architecture, performance may be improved over conventional combinable adders such as conventional ripple carry adders.

Performance improvements may be obtained without significantly sacrificing the performance of the individual smaller adder blocks that are used in forming the wider adders. Hybrid adders in accordance with embodiments of the invention may also scale well to larger sizes and may be more area efficient than conventional adder architectures such as conventional carry look-ahead adders.

Parallel prefix adder circuitry in the hybrid adders may be used to compute carry values. This may reduce or eliminate placement requirements (e.g., requirements that certain adders be placed in vertically aligned logic regions). Ternary adders may also be implemented using the hybrid adder architecture.

Hybrid adder circuitry in accordance with embodiments of the present invention may be part of any suitable integrated circuit. For example, the hybrid adder circuitry of the present invention may be implemented on programmable logic device integrated circuits. If desired, the hybrid adder circuitry may be implemented on programmable integrated circuits that are not traditionally referred to as programmable logic devices such as microprocessors, digital signal processors, application specific integrated circuits, or other integrated circuits with programmable circuitry. The present invention will generally be described in the context of integrated circuits such as programmable logic device integrated circuits as an example.

Figure 1:
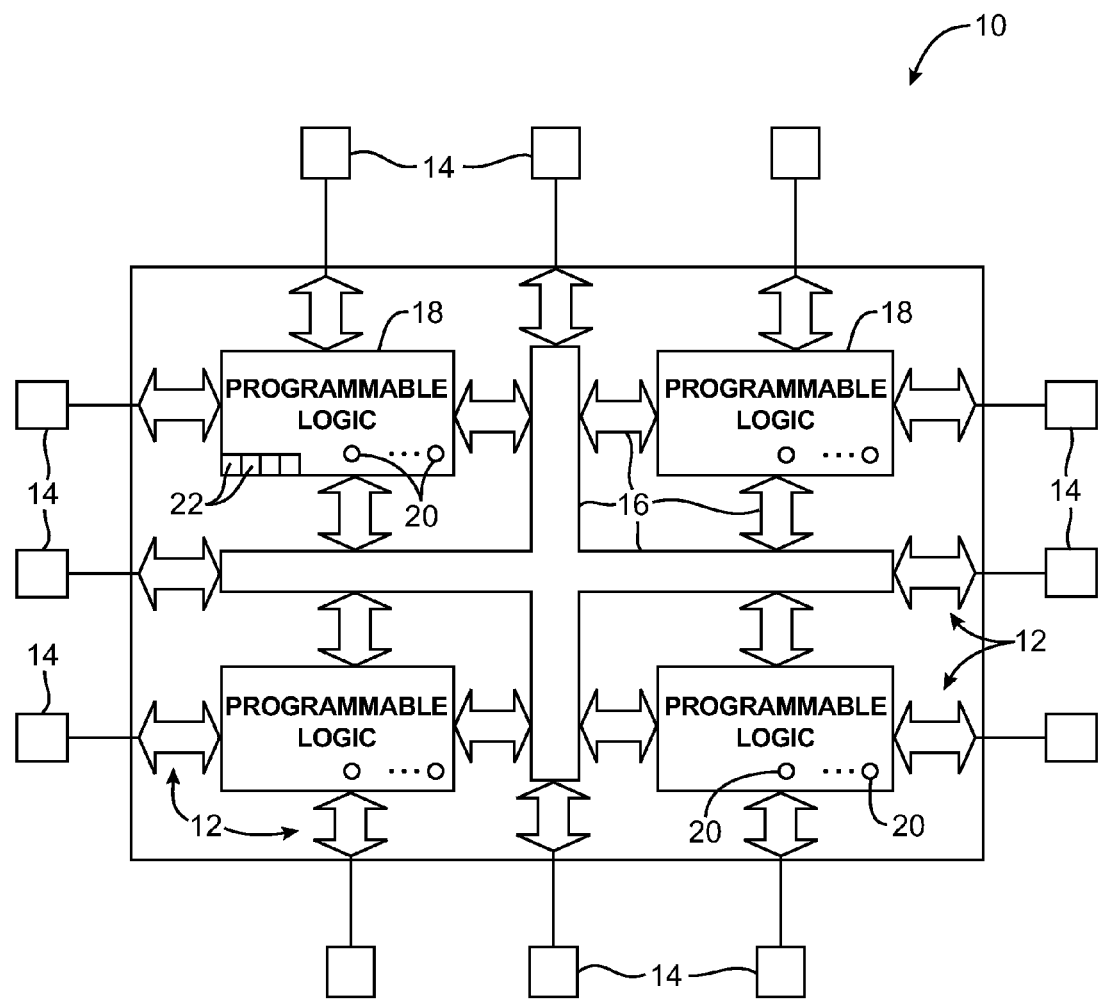
FIG. 1 is a diagram of an illustrative programmable integrated circuit such as a programmable logic device integrated circuit with hybrid adder circuitry in accordance with an embodiment of the present invention.

An illustrative integrated circuit such as a programmable logic device 10 in accordance with the present invention is shown in FIG. 1.

Programmable logic device 10 has input/output circuitry 12 for driving signals off of device 10 and for receiving signals from other devices via input/output pins 14. Interconnection resources 16 such as global and local vertical and horizontal conductive lines and buses may be used to route signals on device 10. Interconnection resources 16 include conductive lines and programmable connections between respective conductive lines and are therefore sometimes referred to as programmable interconnects 16.

Programmable logic 18 may include combinational and sequential logic circuitry. The programmable logic 18 may be configured to perform a custom logic function. The programmable interconnects 16 may be considered to be a type of programmable logic 18.

Programmable logic device 10 contains programmable memory elements 20. Memory elements 20 can be loaded with configuration data (also called programming data) using pins 14 and input/output circuitry 12. Once loaded, the memory elements each provide a corresponding static control signal that controls the operation of an associated logic component in programmable logic 18. In a typical scenario, the outputs of the loaded memory elements 20 are applied to the gates of metal-oxide-semiconductor transistors in programmable logic 18 to turn certain transistors on or off and thereby configure the logic in programmable logic 18 and routing paths. Programmable logic circuit elements that may be controlled in this way include parts of multiplexers (e.g., multiplexers used for forming routing paths in programmable interconnects 16), look-up tables, logic arrays, AND, OR, NAND, and NOR logic gates, pass gates, etc.

Memory elements 20 may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements 20 are loaded with configuration data during programming, memory elements 20 are sometimes referred to as configuration memory, configuration RAM, or programmable memory elements.

The circuitry of device 10 may be organized using any suitable architecture. As an example, the logic of programmable logic device 10 may be organized in a series of rows and columns of larger programmable logic regions each of which contains multiple smaller logic regions. The smaller regions may be, for example, regions of logic that are sometimes referred to as logic elements (LEs), each containing a look-up table, one or more registers, and programmable multiplexer circuitry. The smaller regions may also be, for example, regions of logic that are sometimes referred to as adaptive logic modules (ALMs). Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) containing multiple logic elements or multiple ALMs. In the example of FIG. 1, illustrative logic regions 22 (which may be, for example, LEs or ALMs) are shown in one of the larger regions of programmable logic 18 in FIG. 1 (which may be, for example, a logic array block). In a typical programmable logic device 10, there may be hundreds or thousands of smaller logic regions 22. The logic regions 22 that are shown in FIG. 1 are merely illustrative.

During device programming, configuration data is loaded into device 10 that configures the programmable logic regions 22 and programmable logic regions 18 so that their logic resources perform desired logic functions on their inputs and produce desired output signals. For example, CRAM cells are loaded with appropriate configuration data bits to configure adders and other circuits on device 10 to implement desired custom logic designs. During configuration, general purpose "soft" (programmable logic) resources (e.g., programmable look-up table logic) may be configured to implement adder circuits (e.g., a half adder, a look-up table circuit for computing a carry signal, etc.). Such adder components may also be implemented using hardwired circuits. Hybrid adder circuitry in accordance with embodiments of the present invention may use any suitable combination of soft and hardwired adder circuitry.

The resources of device 10 such as programmable logic 18 may be interconnected by programmable interconnects 16. Interconnects 16 generally include vertical and horizontal conductors. These conductors may include global conductive lines that span substantially all of device 10, fractional lines such as half-lines or quarter lines that span part of device 10, staggered lines of a particular length (e.g., sufficient to interconnect several logic array blocks or other such logic areas), smaller local lines, or any other suitable interconnection resource arrangement. If desired, the logic of device 10 may be arranged in more levels or layers in which multiple large regions are interconnected to form still larger portions of logic. Still other device arrangements may use logic that is not arranged in rows and columns.

In addition to the relatively large blocks of programmable logic that are shown in FIG. 1, the device 10 generally also includes some programmable logic associated with the programmable interconnects, memory, and input-output circuitry on device 10. For example, input-output circuitry 12 may contain programmable input and output buffers. Interconnects 16 may be programmed to route signals to a desired destination.

Figure 2:
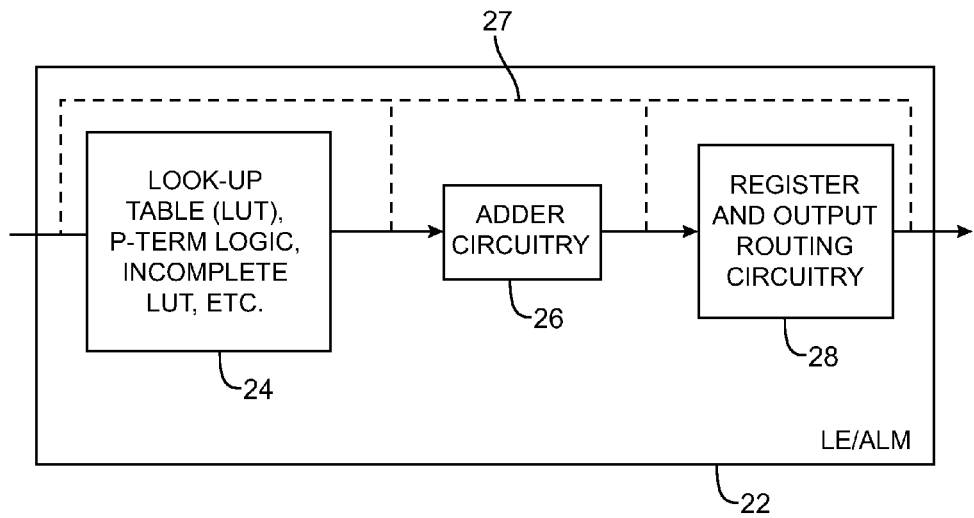
FIG. 2 is a diagram of an illustrative region of logic such as a logic element (LE) or adaptive logic module (ALM) that may be used in a programmable integrated circuit in accordance with an embodiment of the present invention.

An illustrative region of logic of the type that may be referred to as a logic element or adaptive logic module is shown in FIG. 2. As shown in the FIG. 2 example, region 22 may have combinatorial logic 24 such as a look-up table (LUT) circuit, p-term logic circuitry, an incomplete LUT circuit, etc., adder circuitry 26, and register and output routing circuitry 28. Look-up table circuitry in circuitry 24 may have any suitable number of inputs (e.g., 4 inputs, 6 inputs, etc.). Register and output circuitry 28 may include flip-flops or other latches, output drivers, and multiplexers or other configurable circuits to perform configurable routing functions. As indicated schematically by dashed lines 27, region 22 may contain bypass paths (e.g., to bypass look-up table circuitry 24, to bypass adder circuitry 26, and/or to bypass registers in circuitry 28). Multiplexers or other switching circuitry may be programmably configured to route signals along such bypass paths when desired.

Adder circuitry 26 may include hybrid adder circuitry in accordance with embodiments of the present invention.

Adder circuitry 26 may include adder components such as half adders and full adders and may be based on adder circuits of different architectures such as the ripple carry adder architecture (including ripple carry adders with carry select capabilities), the carry select adder architecture (including carry select adders with ripple carry capabilities), and the carry look-ahead adder architecture (as examples).

Figure 3:
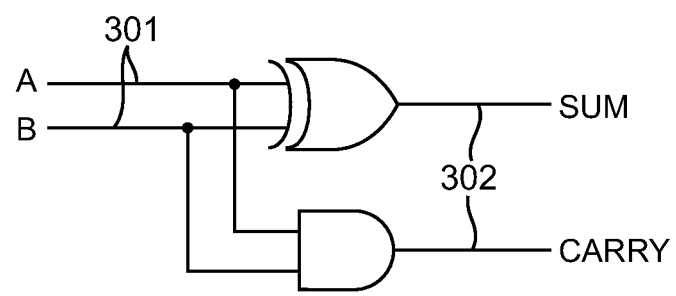
FIG. 3 is a diagram of a conventional half adder.

A half adder is shown in FIG. 3. As shown in FIG. 3, half adder 300 has two inputs. Binary input data to be added is provided as one-bit signals A and B on inputs 301. Half adder 300 processes input signals A and B and produces corresponding SUM and CARRY output signals at outputs 302. The SUM and CARRY signal collectively form the result of adding the two one-bit signals A and B. The signal SUM is the least significant bit of the sum of A and B and the signal CARRY is the most significant bit of the sum of A and B.

Figure 4:
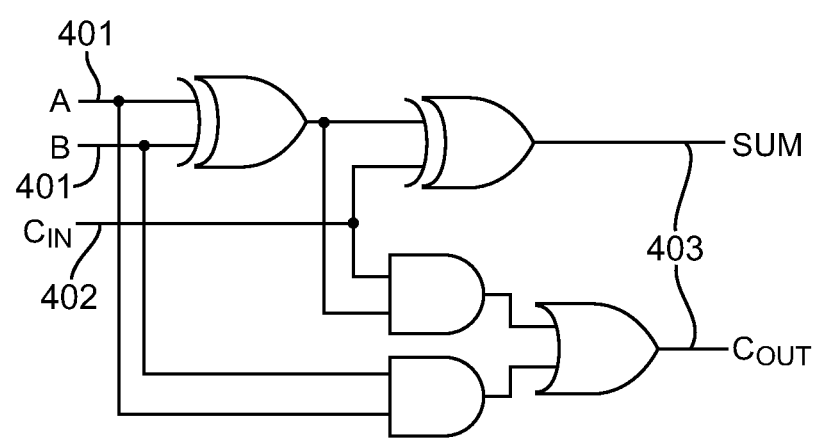
FIG. 4 is a diagram of a conventional full adder.

A full adder is shown in FIG. 4. As shown in FIG. 4, full adder 400 receives one-bit inputs A and B on inputs 401 and adds these inputs taking into account the value of carry input signal Cin on input 402. Carry input signal Cin corresponds to the carry output produced by an adjacent adder corresponding to a less significant bit position. The resulting sum of the inputs on inputs 401 and 402 is provided in the form of SUM and carry output Cout signals on outputs 403. In the event that adder 400 is connected in a chain, the carry out signal Cout may be routed to the Cin input line of the next adder. A full adder such as full adder 400 can be constructed from two half adders and an OR gate. A first of the two half adders receives A and B. A second half adder receives the sum output from the first half adder and receives Cin. The second half adder produces the SUM signal for the full adder. The second half adder may also produce a carry out signal. The carry out signal from the second half adder and a carry out signal from the first half adder may be combined using an OR gate and the resulting output of the OR gate may be used as the Cout signal for the full adder.

Figure 5:
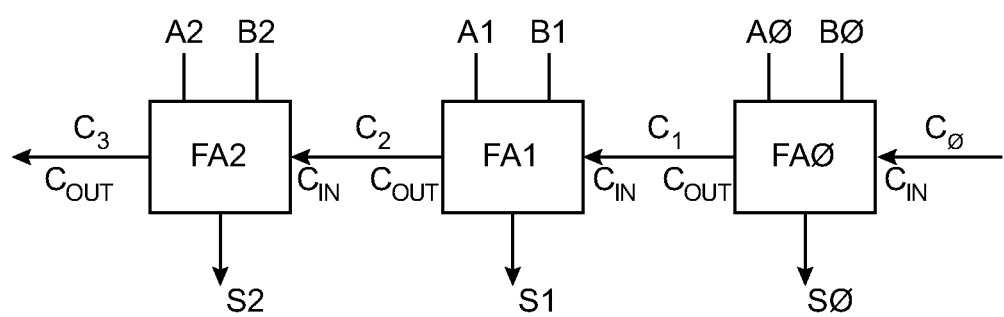
FIG. 5 is a diagram of a conventional ripple carry adder.

A ripple carry adder may be formed from a chain of full adders. This type of arrangement is shown in FIG. 5. As shown in FIG. 5, ripple carry adder 500 is formed from a chain of multiple full adders (FA0, FA1, FA2, etc.), each having its carry in $C_{in}$ tied to the carry out $C_{out}$ port of the preceding full adder. For example, as shown in FIG. 5, full adder FA1 receives the carry out signal C1 of the preceding full adder FA0 in the chain and provides its carry out signal C2 to the next full adder FA2.

Adders such as these are referred to as a ripple carry adders because the correct value of the carry bit "ripples" from one bit to the next. Ripple carry adders can be efficient to implement, but have limited performance. A valid output signal is not produced until the carry output of the last bit has been computed. Because the carry signal ripples through all of the stages of the adder, there is a computational delay proportional to the length of the adder chain.

Figure 6:
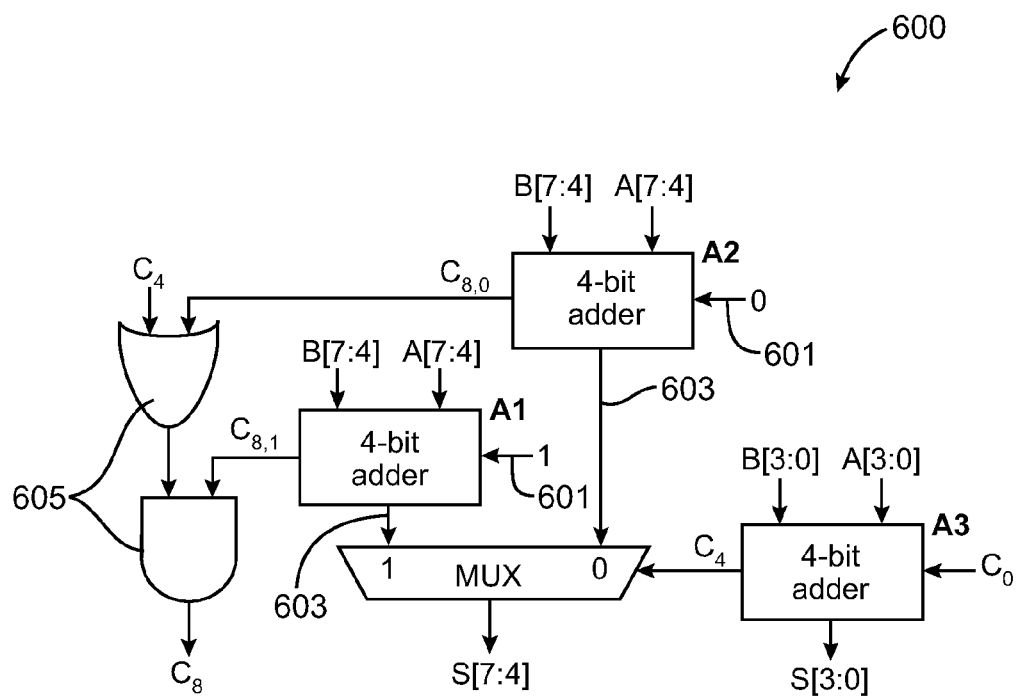
FIG. 6 is a diagram of a slice of a conventional carry select adder.

Carry select adders perform addition more rapidly than ripple carry adders. An 8-bit carry select adder is shown in FIG. 6. As shown in FIG. 6, carry select adder 600 receives inputs A and B and produces corresponding sum and carry out signals. Carry select adder 600 has three adders (A1, A2 and A3) and has a multiplexer MUX. Adders A2 and A1 are used to compute two different versions of the carry and sum signals for the adder, one based on a fixed carry input signal "0" and one based on a fixed carry input signal "1" received on inputs 601. Multiplexer MUX receives corresponding precomputed sum signals on lines 603. Logic gates 605 receive precomputed carry out signals from adders A1 and A2 and provide carry out signal $C_8$. The carry select adder may receive a carry-in signal $C_0$ from a preceding adder. This carry in signal $C_0$ is used in producing C4 at the control input of multiplexer MUX and is used in selecting which of the sum signals at the input to multiplexer MUX should be used as the sum output of adder 60. Because the sum signals at the inputs to multiplexer MUX are precomputed in parallel by adders A2 and A1, addition operations can be performed more rapidly than with ripple carry adders.

Figure 7:
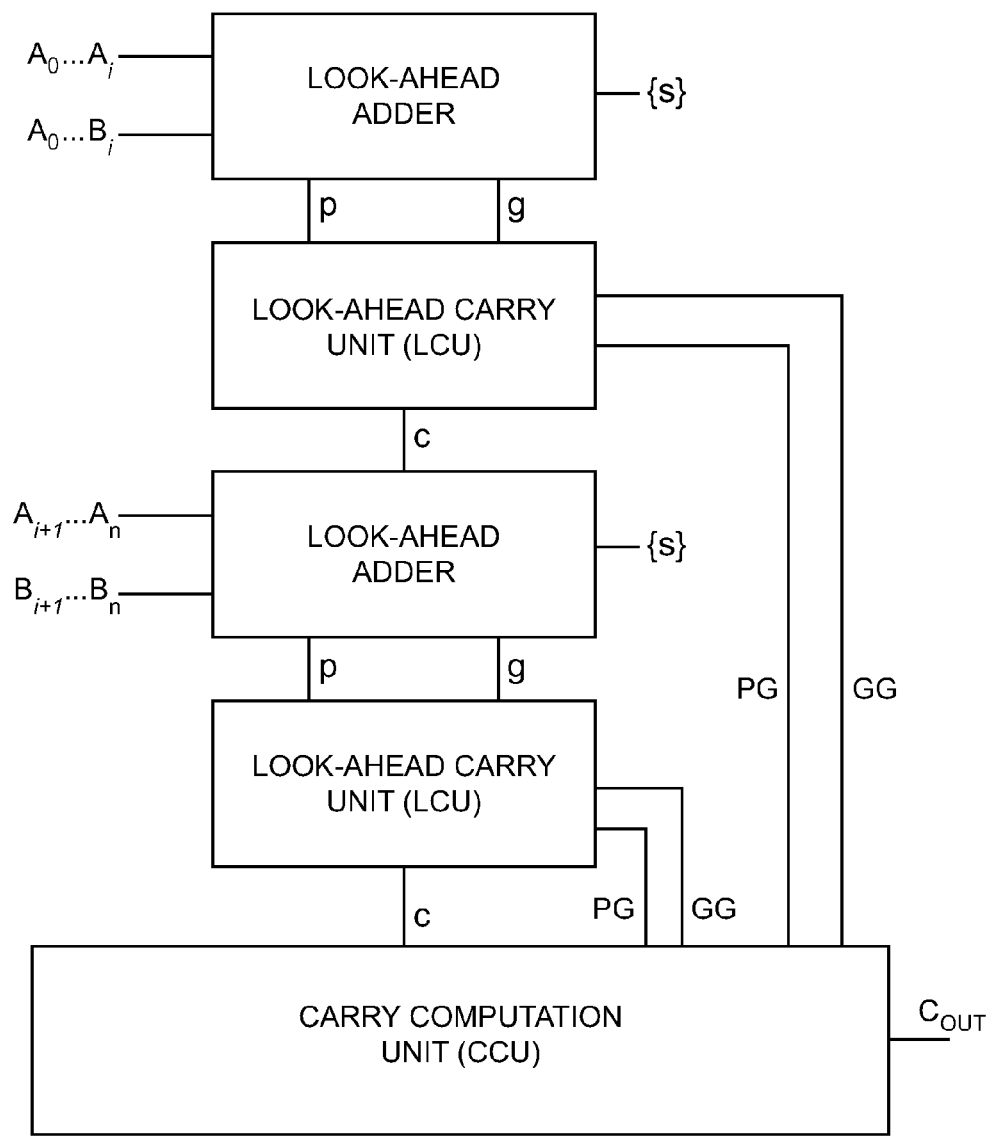
FIG. 7 is a diagram of a conventional carry look-ahead adder.

A carry look-ahead adder (CLA) is shown in FIG. 7. As shown in FIG. 7, carry look-ahead adder 700 may have a series of interleaved adders and look-ahead carry units (LCUs). Each adder adds one or more input bits of input signal A to one or more input bits of input signal B to produce a corresponding sum signal {S}. For example, a first look-ahead adder may be used to add the first four bits of A (i.e., $A_0 \ldots A_3$) to the first four bits of B (i.e., $B_0 \ldots B_3$), a second look-ahead adder may be used to add the next four bits of A (i.e., $A_4 \ldots A_7$) to the next four bits of B (i.e., $B_4 \ldots B_7$), etc.

Propagate signals {p} and generate signals {g} are produced by each adder. The propagate signals {p} and generate signals {g} from each adder are passed to an associated look-ahead carry unit (LCU). Each look-ahead carry unit, in turn, produces a corresponding propagate signal PG and generate signal GG. The propagate signals PG, the generate signals GG, and a carry signal C from the last look-ahead carry unit are received by a carry computation unit (CCU) and are processed by the carry computation unit to produce the most significant bit of the output (i.e., the $C_{out}$ signal). The sum of A and B is represented by the S signals from each adder and the Cout bit.

Particularly when performing computations on wide data words, carry look-ahead adders may be faster than ripple carry adders and carry select adders. However, conventional carry look-ahead adders operate on data words of fixed widths and are not configurable to handle input data words of different desired widths as is sometimes required on programmable integrated circuits.

Configurable hybrid adders in accordance with embodiments of the present invention may include adder components of different types (e.g., ripple carry, carry select, carry look-ahead, etc.). These adders may perform addition more rapidly than other configurable adder arrangements (e.g., configurable adders based on combinable ripple carry adder blocks), particularly when processing wide inputs (e.g., inputs with bit widths of about 40 bits or more as an example).

Figure 8:
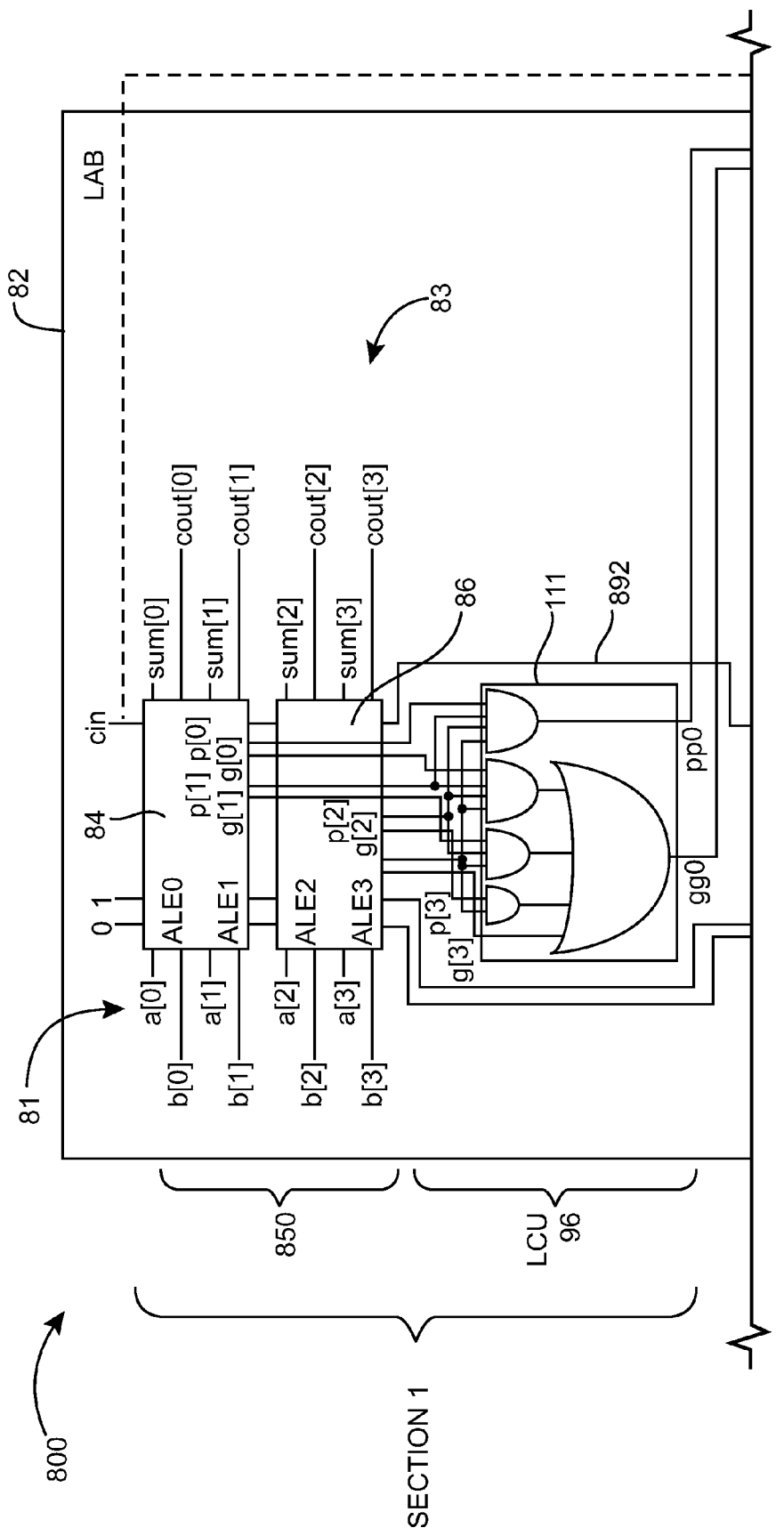
FIG. 8 is a diagram of an illustrative hybrid adder in accordance with an embodiment of the present invention.

FIG. 8 is a diagram of an illustrative hybrid adder in accordance with an embodiment of the present invention. Hybrid adder 800 may be formed from a region of programmable logic 18 on a programmable integrated circuit 10. For example, hybrid adder 800 may be formed using the resources associated with one or more logic array blocks 82 on a programmable logic device integrated circuit, as shown by logic array block 82 of FIG. 8. When it is desired to form an adder having a large width, the resources of more than one logic array block (or other suitable region of logic) may be selectively combined. An adder of this type may be formed, for example, using all of the adder resources in one logic array block and part of the adder resources in another logic array block (as an example). When it is desired to form a smaller adder, some or all of the resources of a single logic array block may be used.

In the example of FIG. 8, logic array block 82 has adaptive logic module adder circuits 84, 86, 88, 90, 92, and 94, each having adder circuitry from two associated logic regions such as adaptive logic elements (ALEs) ALE0, ALE1, ALE2, ALE3, ALE4, ALE5, ALE6, ALE7 . . . ALE19. The circuitry of FIG. 8 may be programmed to form adders of various widths, depending on the needs of a logic designer. When larger data widths are needed, the adder circuitry resources of relatively more ALEs are combined to form the adder. When smaller data widths are desired, relatively fewer ALEs may be combined to form the adder.

Hybrid adder 800 may, if desired, provide the functionality of a 20-bit adder. In this type of configuration, adder 800 may be formed from five sections, each summing four bits (i.e., bits a[0], b[0], a[1], b[1], a[2], b[2], a[3], b[3] in the first section and four bits in each succeeding section). Each 4-bit adder section receives 4-bit inputs (e.g., four bits of input A and four bits of input B). In addition, each 4-bit adder section receives a carry in bit ($C_{in}$) bit. The input bits A and B may be supplied from any suitable source (e.g., a programmable interconnect or the output of a look-up table or other combinatorial logic 24 connected to the adder inputs as shown in FIG. 2).

Each adder section then produces 4-bit sum and carry outputs (e.g., sum and carry outputs 83, such as sum[0], cout[0], sum[1], cout[1], sum[3], cout[3], sum[4], and cout [4] for section 1). Each adder section also provides a corresponding look-ahead carry unit 96, 98, . . . 100 with propagate and generate signals p and g. Carry signals are supplied on carry paths 892 (e.g., for forming ripple carry chains).

Each section of adder 800 may be formed using the adder circuitry of one or more logic regions. In the FIG. 8 example, adders 850, 851, and . . . 852 are formed from adaptive logic module adder circuitry (e.g., circuitry such as adder circuitry 26 of FIG. 2). With this type of arrangement, adder circuits 84 and 86 form a first 4-bit adder 850. Adder circuits 84 and 86 may be located in respective ALMs. Similarly, adder 851 may be formed from ALM adder circuit 88 and ALM adder circuit 90 and adder 852 may be formed from adder circuits 92 and 94.

As shown in FIG. 8, each look-ahead carry unit may provide propagate and generate signals to carry computation unit 102. For example, look-ahead carry unit 96 may provide propagate signal pg0 and generate signal gg0 at the output of logic 111 to the inputs of carry computation unit 102 for processing by logic such as logic gates 132, 134, 136, 138, 140, and 142. Similarly, logic 120 in look-ahead carry unit 98 may provide propagate and generate signals pg4 and gg4 to carry computation unit 102 and logic 130 of look-ahead carry unit 100 may provide propagate and generate signals pg16 and gg16 to carry computation unit 102. The output of carry computation unit 102 represents the carry output signal Cout for adder 800.

The size of adder 800 can be configured by adjusting the number of adders and associated look-ahead carry units whose signals feed carry computation unit 102 (or by forming a carry chain of desired length using paths 892). Smaller adders 800 can be implemented by combining the circuitry of only a few adders (i.e., a first adder 850 formed by the adder circuitry 84 and 86 of a first pair of ALMs and a second adder 851 formed by the adder circuitry 88 and 90 of a second pair of ALMs). Larger adders may be implemented by combining the adder of each section (e.g., sections 1-5 including adder 852 and its adder circuits 92 and 94 in the FIG. 8 example). Still larger adders may be formed using the resources of multiple logic array blocks.

During configuration operations such as these, programmable memory elements 20 (FIG. 1) are loaded with configuration data that programs the adder circuitry as desired. Programmable multiplexers or other programmable routing resources may be used to selectively combine adder resources in this way.

As shown in FIG. 8, hybrid adder 800 may use a carry look-ahead adder for its overall architecture. The hybrid nature of hybrid adder 800 results from the use of different (non-carry-look-ahead) adder types for adder blocks 850, 851, 852 and/or the ability to combine adders such as adder 800 with adders formed from other logic array blocks (e.g., with ripple carry adder circuitry in an adjacent logic array block).

Figure 9:
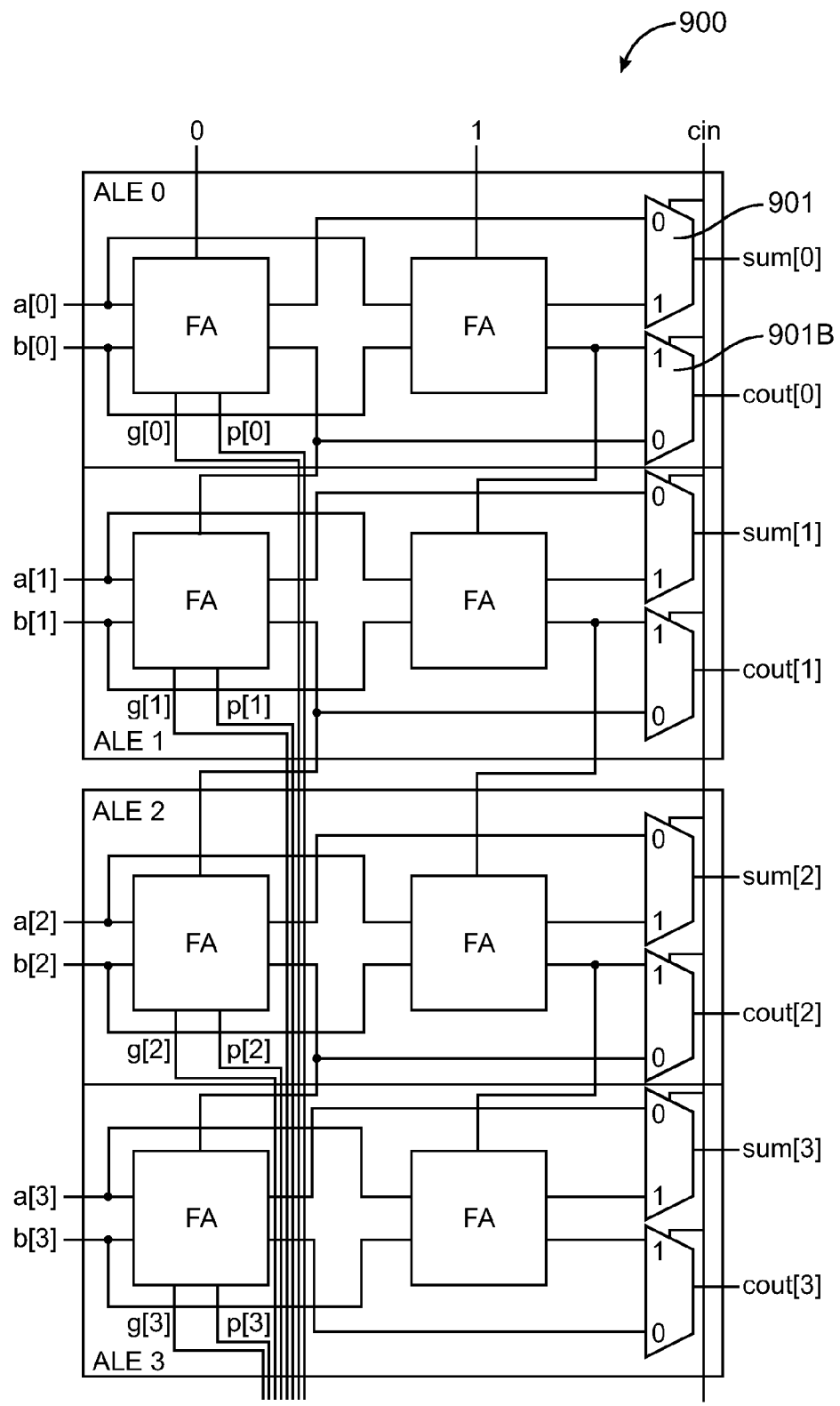
FIG. 9 is a diagram of an illustrative carry select adder with ripple carry capabilities that may be used in a hybrid adder of the type shown in FIG. 8 in accordance with an embodiment of the present invention.

As an example, consider the use of a carry select adder architecture for adders such as adders 850, 851, . . . , and 852 of FIG. 8. A diagram of illustrative carry select adder circuitry 900 that may be used for adders 850, 851, and 852 of FIG. 8 is shown in FIG. 9. In the example of FIG. 9, carry select adder 900 has ripple carry adder capabilities. Adders such as these may sometimes be referred to as carry select adders, carry select adders with ripple carry adder capabilities, ripple carry adders with carry select capabilities, or ripple carry adders.

As shown in FIG. 9, carry select adder 900 may be formed from full adders (FA). Carry select multiplexers 901 may be controlled by carry input signal Cin (which may function as a carry select control signal for multiplexers 901). As described in connection with FIG. 6, carry select adder 900 may add signals A and B on its inputs to produce corresponding SUM and CARRY signals on its outputs. As the FIG. 9 example demonstrates, each logic element (ALE0, ALE1, etc.) may be used to perform a single bit of addition. With this type of arrangement, four logic elements (in two ALMs) may be used for each adder block of FIG. 8 (e.g., for adder 850, for adder 851, . . . , and for adder 852). Each pair of full adders (e.g., the full adders FA in ALE0) may be used to handle a bit of addition. By using carry select adders for implementing the adder blocks in adder 800, delays that might otherwise be associated with, for example, conventional ripple carry adders, can be reduced.

Figure 10:
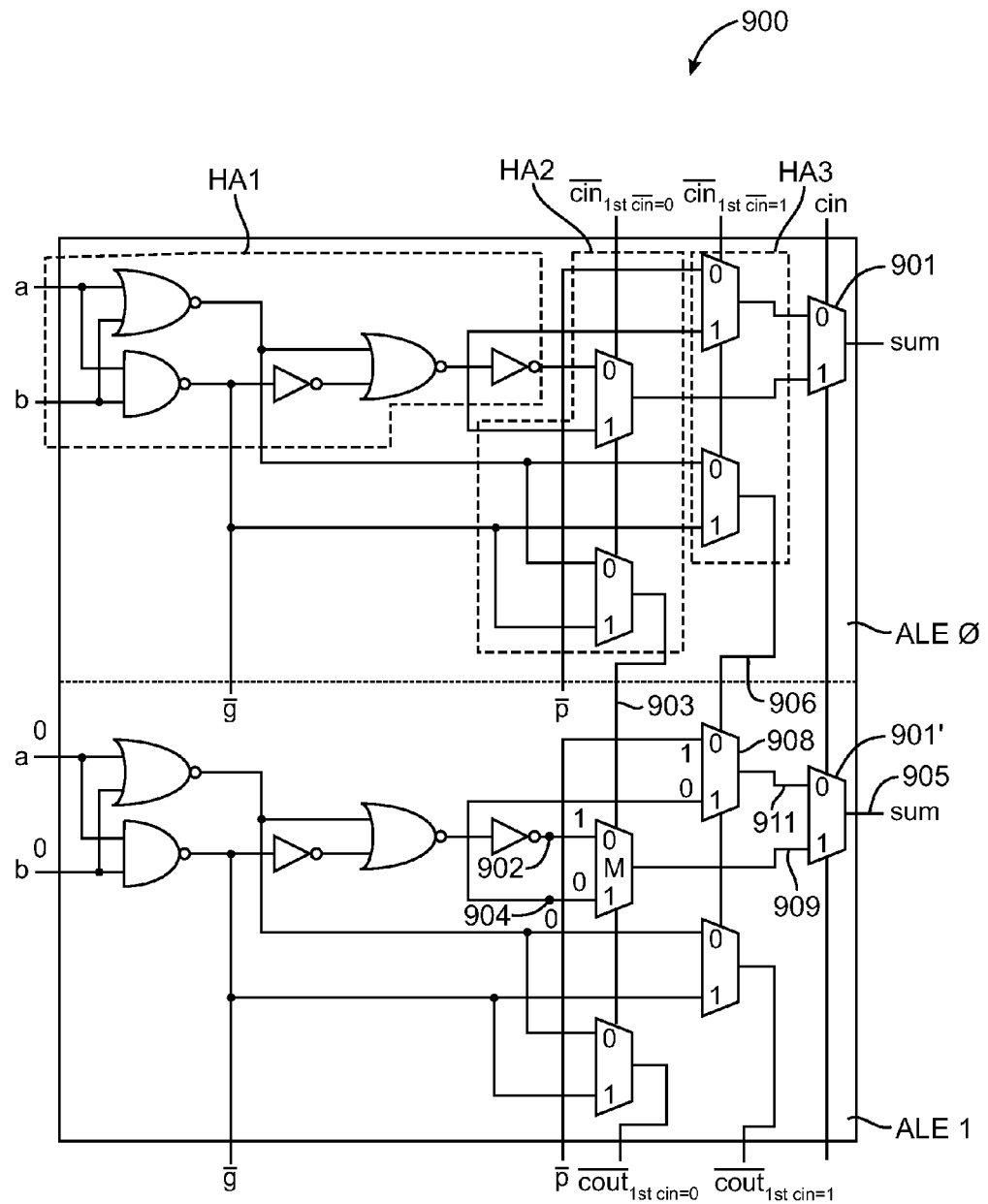
FIG. 10 is a diagram of another illustrative carry select adder with ripple carry capabilities that may be used in a hybrid adder of the type shown in FIG. 8 in accordance with an embodiment of the present invention.

If desired, circuit resources can be conserved by forming each pair of full adders FA in adder 900 of FIG. 9 using three half-adder-type circuits. In this type of configuration, a first half-adder-type circuit is shared by second and third half-adder-type circuits. As shown in FIG. 10, for example, circuit HA1 may be shared between circuits HA2 and HA3. A first full adder is formed from circuit HA1 and circuit HA2. A second full adder is formed from circuit HA1 and circuit HA3.

As the FIG. 10 example demonstrates, it is not necessary to provide two multiplexers on the output of each logic element. Rather, one of the two multiplexers in each ALE of FIG. 9 (i.e., multiplexer 901B) can be eliminated, leaving only a single sum multiplexer 901 in each ALE. By eliminating the carry multiplexer from each ALE, resource consumption is reduced. The carry signal in this type of configuration can be handled by the last ALE in the chain. This last ALE is configured (by suitable programmable logic programming of look-up table logic connected to the ALE inputs as an example) so that signals A and B on its inputs are both a logic low ("0").

In the example of FIG. 10, the inputs A and B to ALE1 have been configured to be a fixed value of "0". Whenever A and B are both 0 on the inputs to ALE1, the signal on node 902 will be a fixed high signal and the signal on node 904 will be a fixed low signal. Multiplexer M is controlled by the carry signal on line 903, which becomes a select control signal for multiplexer M. With a 11 on inputs ab of HA1, line 903 will be low and line 906 will be low. As a result, output line 911 of multiplexer 908 will be high and the output signal on line 909 will be high. In turn, this yields a sum signal on output 905 that is high (1) independent of cin if ab is 11, a low (0) independent of cin if ab is 00, and a low (0) or a high (1) depending on whether cin is 0 or 1 if ab is 01 or 10. With this type of arrangement, the SUM signal at output 905 is selected by the Cin signal controlling multiplexer 901' and is either the carry signal associated with line 903 or the carry signal associated with line 906, depending on the state of Cin. The "SUM" signal on line 905 therefore serves as the carry out signal (most significant bit) for the addition performed by all previous adder stages (e.g., adder stage ALE0 in this example).

Figure 16:
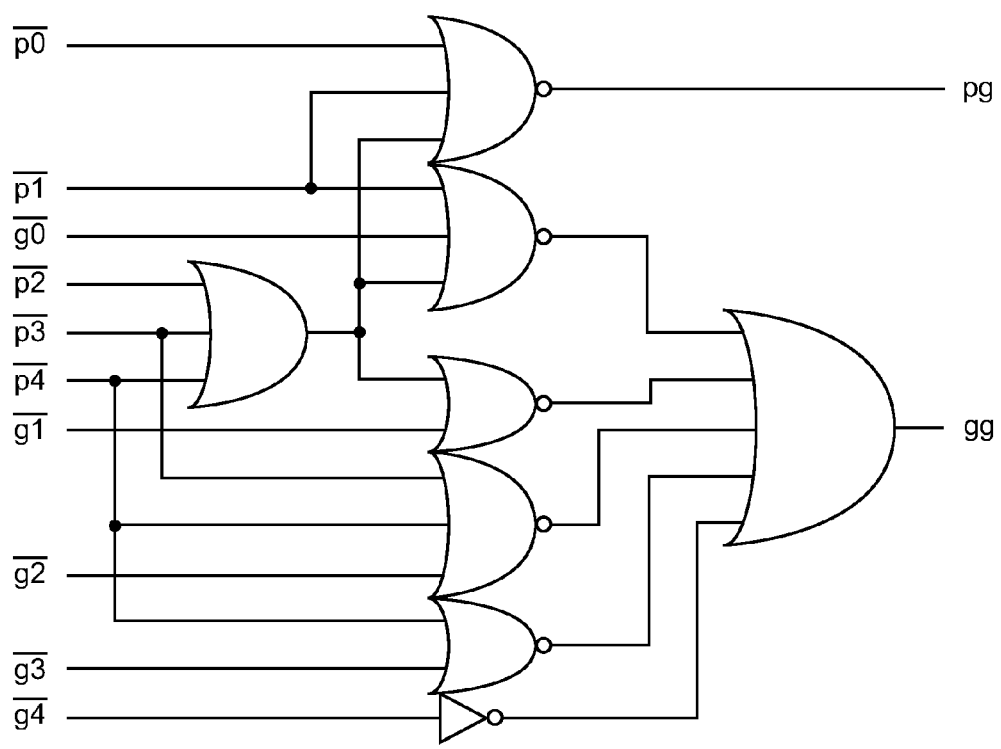
FIG. 16 is a diagram of an illustrative look-ahead carry unit that may be used in hybrid adder circuitry in accordance with an embodiment of the present invention.

As shown in FIG. 10, the p and g signals that are produced are produced in inverted form (!p/!g). This allows the look-ahead carry units to be generated efficiently (e.g., using a carry-look-ahead circuit arrangement of the type shown in FIG. 16).

In the example of FIGS. 8, 9, and 10, adder 800 was formed using adder circuitry in which four bits of addition were performed by each ALM. If desired, the circuitry of logic regions such as logic array blocks 82 may be used to perform different amounts of addition per ALM (or other such portion of programmable logic). An example in which two bits of addition are performed per ALM is shown in FIGS. 11 and 12.

Figure 11:
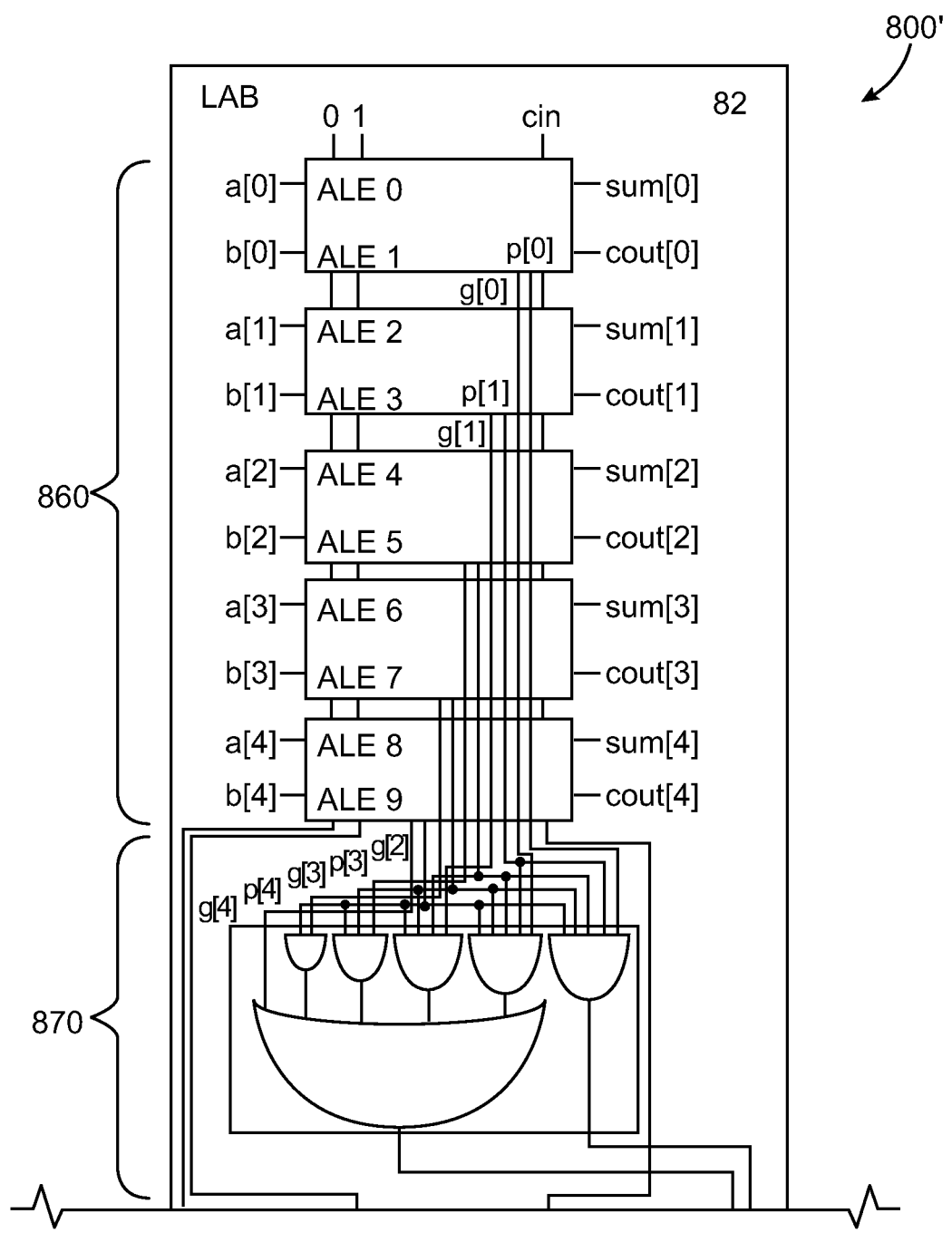
FIG. 11 is a diagram of another illustrative hybrid adder in accordance with an embodiment of the present invention.
Figure 11:
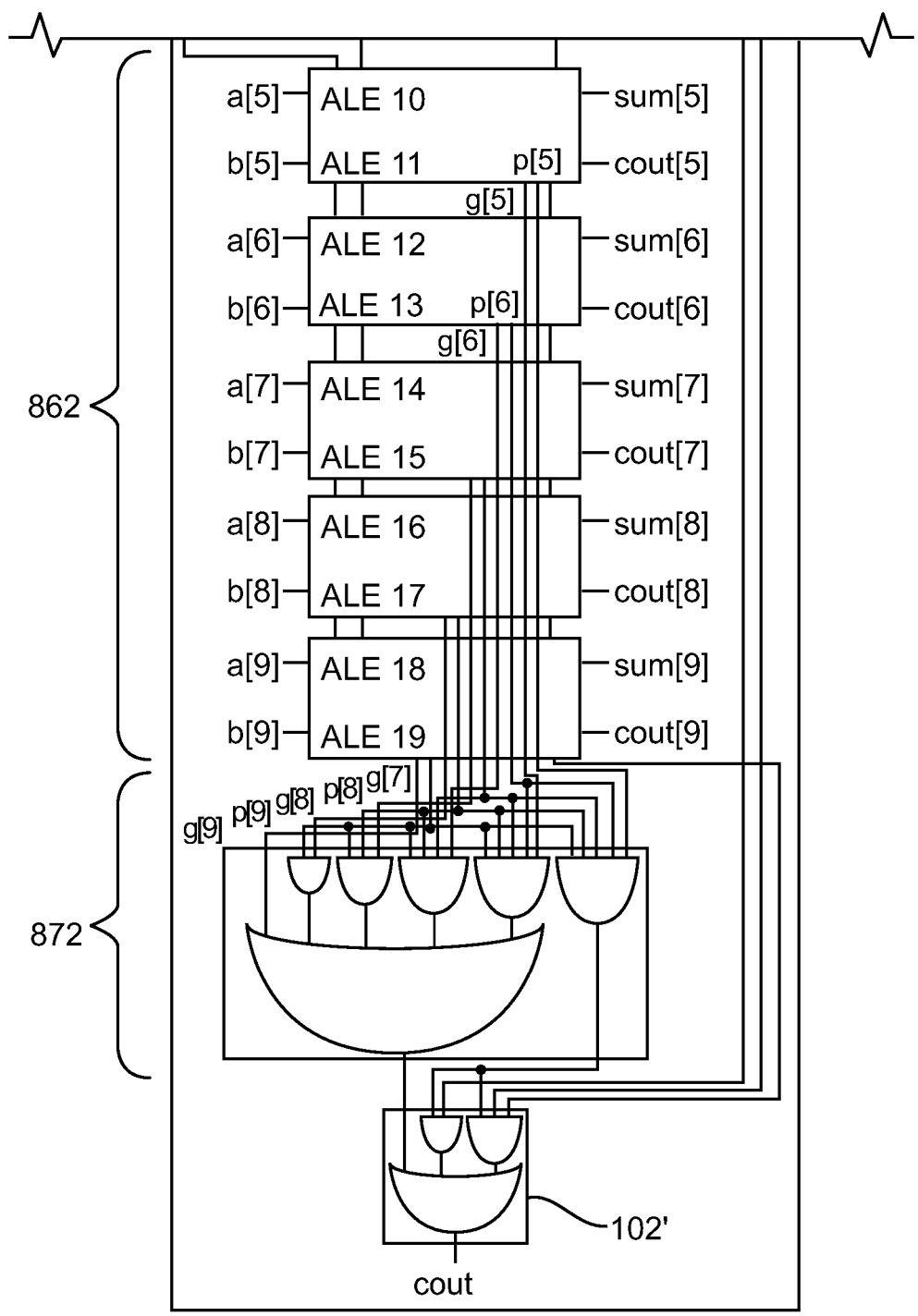
Figure 12:
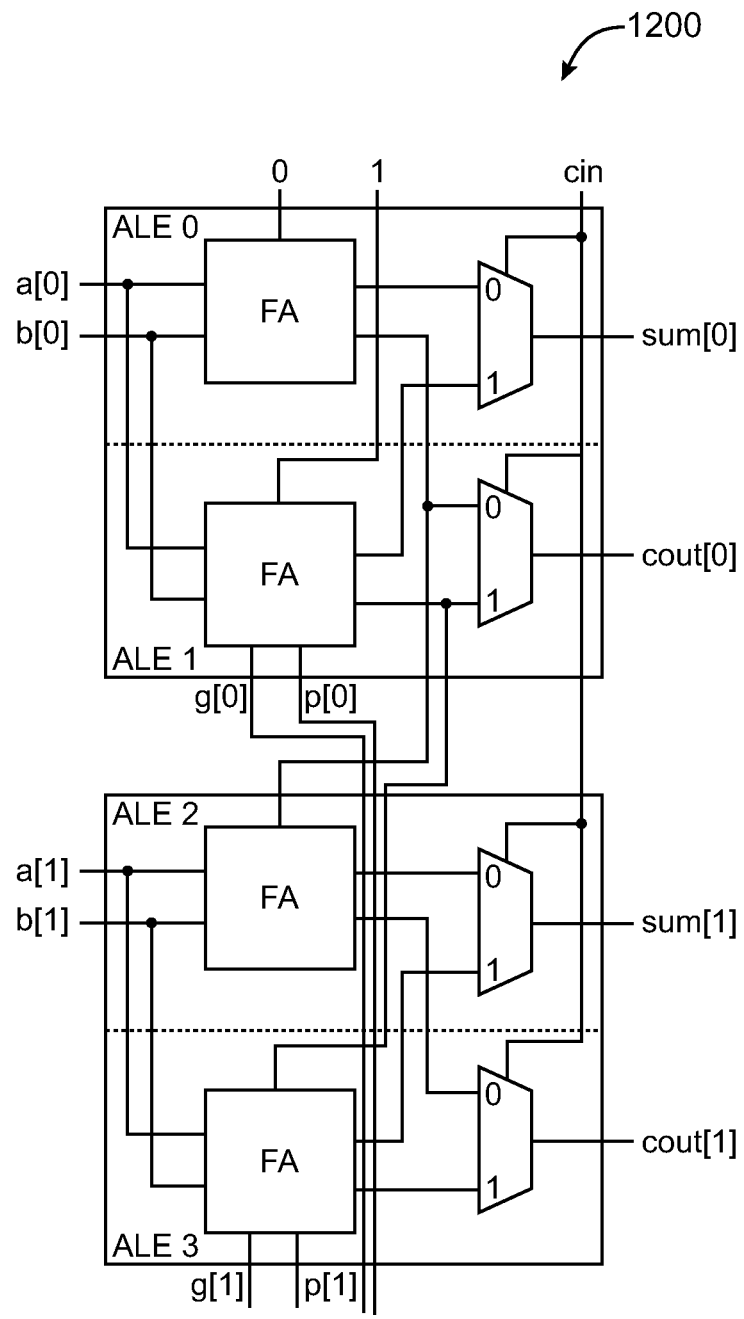
FIG. 12 is a diagram of a carry select adder with ripple carry capabilities that may be used in a hybrid adder in accordance with an embodiment of the present invention.

As shown in FIG. 11, configurable hybrid adder 800' may be formed from adders 860 and 862. As described in connection with adder 800 of FIG. 8, the outputs from adder 860 and adder 862 may be processed by respective look-ahead carry units 870 and 872. The outputs of look-ahead carry units 870 and 872 may be processed by carry computation unit 102'. FIG. 12 shows illustrative carry select circuitry 1200 (i.e., a carry select adder with ripple carry capabilities also sometimes referred to as a ripple carry adder with carry select capabilities, etc.) that may be used in implementing adders 860 and 862. Carry select circuitry 1200 of FIG. 12 performs one bit of addition per each logic element (ALE) and two bits of addition per each ALM. As described in connection with FIG. 10, the lower carry select multiplexer in each block of FIG. 12 may be eliminated, provided that the resources of the last ALE are used to handle the carry out signal.

Figure 13:
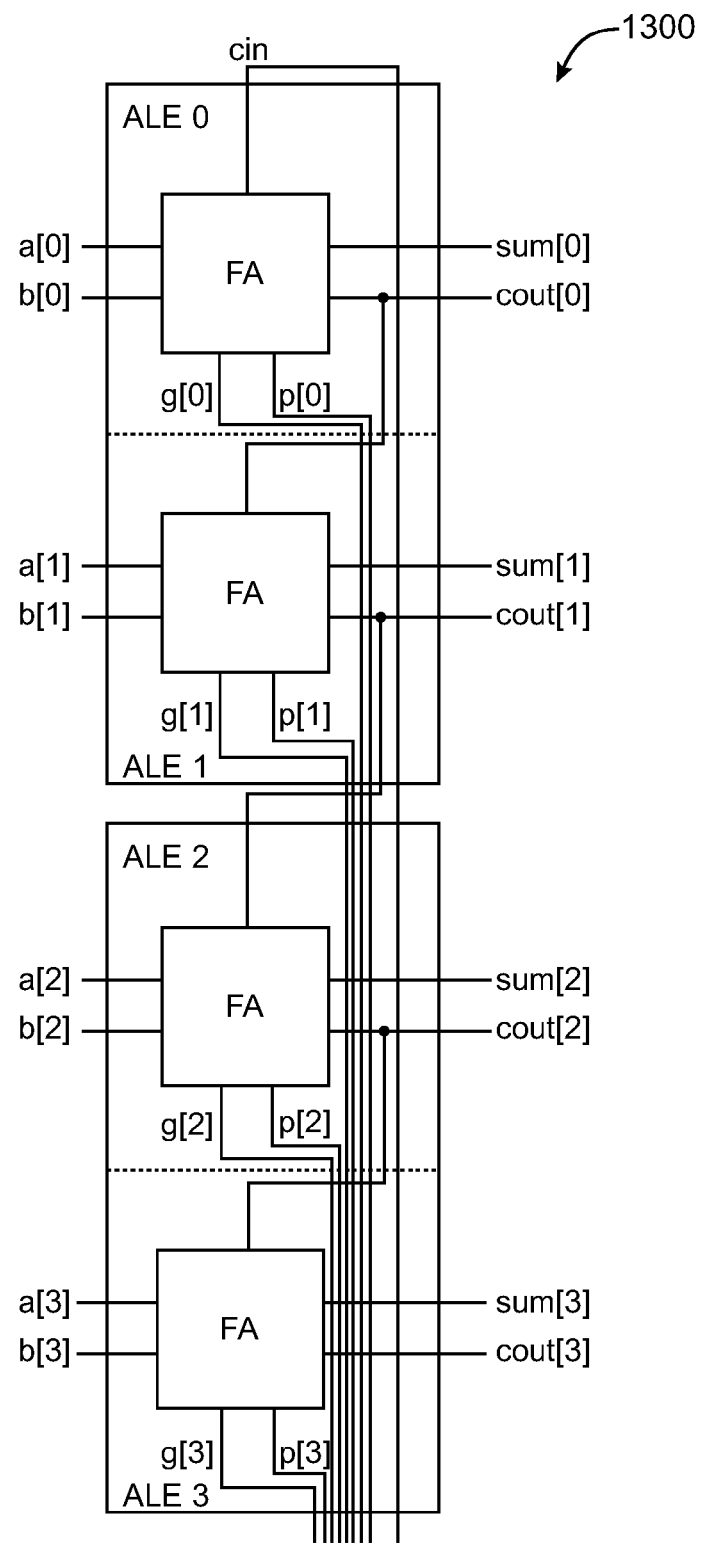
FIG. 13 is a diagram of a ripple carry adder that may be used in a hybrid adder in accordance with an embodiment of the present invention.

If desired, adder circuitry of other types may be used in forming hybrid adders. For example, adders such as adders 850, 851, . . . and 852 of hybrid adder 800 (FIG. 8)) may be formed using a ripple carry adder (with propagate and generate outputs) such as ripple carry adder 1300 of FIG. 13. In this type of arrangement, the p and g signals that are produced at the outputs of the full adders FA may be routed to look-ahead carry units such as look-ahead carry units 96, 98, and 100 in hybrid adder 800. A carry in path such as the path represented by dotted line 890 of FIG. 8 may be used in this type of arrangement to convey carry in signal Cin to the carry computation unit. Hybrid adders in which the carry look-ahead (CLA) architecture of FIG. 8 is provided with ripple carry (RC) adders of the type shown in FIG. 13 are sometimes referred to as hybrid CLA/CR adders (i.e., hybrid carry-look-ahead/carry-ripple adders).

Figure 14:
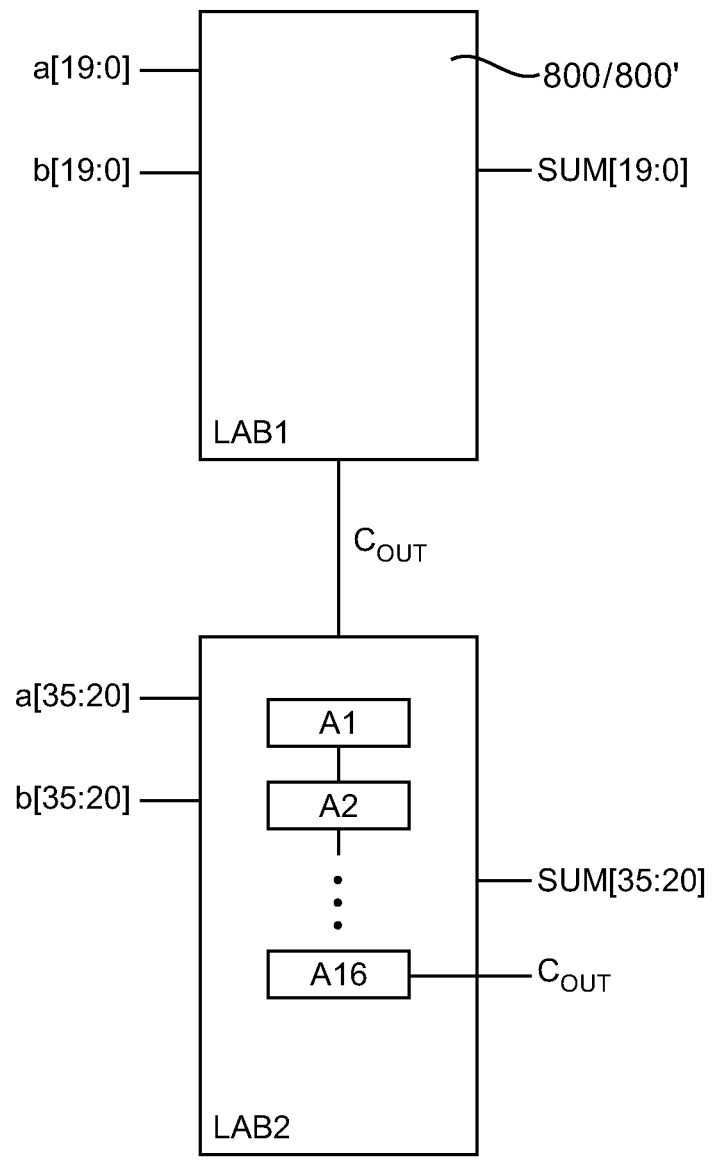
FIG. 14 is a diagram showing how adder resources in multiple logic regions such as logic array blocks may be combined using a hybrid adder architecture in accordance with an embodiment of the present invention.

In the FIG. 8 example, hybrid adder 800 has a look-ahead carry unit formed after every four bits of addition and a carry computation unit 102 that performs a carry computation for five look-ahead carry units. As a result, hybrid adder 800 can perform addition on two 20-bit words (A and B). In some situations, it may be desirable to form an adder capable of adding words that are wider than 20 bits. Consider, as an example, a situation in which it is desired to perform addition on two 36-bit words. This type of situation may be handled using adder circuitry such as the adder circuitry of FIG. 14. With the FIG. 14 adder, the first 20 bits of addition may be performed in a first logic region (e.g., a first logic array block LAB1) using an adder such as adder 800 of FIG. 8 or adder 800' of FIG. 11. A carry out signal Cout from LAB1 may be routed to the carry input of a second region of logic (e.g., a second logic array block LAB2). The second logic array block may be configured to handle 16 bits of addition. The circuitry of LAB2 may, for example, include 16 bits of ripple carry adder circuitry, represented by adder circuits A1 to A16.

Figure 15:
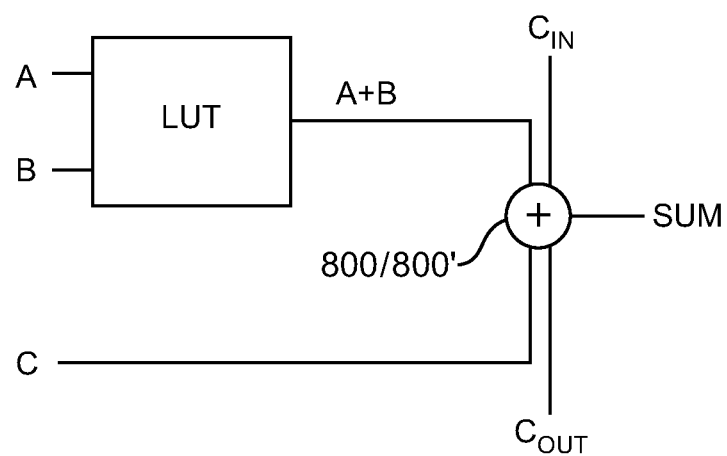
FIG. 15 is a diagram showing how a programmable integrated circuit may be provided with circuitry for supporting ternary addition operations using hybrid adder circuitry in accordance with an embodiment of the present invention.

If desired, ternary addition can be supported with hybrid adders such as hybrid adders 800 and 800' by adding circuitry of the type shown in FIG. 15.

The adder arrangements described above are merely illustrative. For example, carry look-ahead arrangements with different numbers of look-ahead carry units may be used. An advantage of having more look-ahead carry units in a given adder is that each look-ahead carry unit may be smaller in size, although a larger carry computation unit will be required. Computation of the carry signal at the end of each logic array block (or other such region), may be performed to ensure that there are a sufficient number of choices in placing logic array blocks that contain parts of an adder chain. Not every logic region (LAB) on a device 10 need have the same type of hybrid adder circuitry. With this type of arrangement, a logic designer who is creating a custom circuit for a given device 10 may choose whether to implement a hybrid adder of a particular architecture (e.g., using a CLA/RC hybrid adder of one logic array block or using a CLA/CS hybrid adder of another logic array block, as an example).

Figure 17:
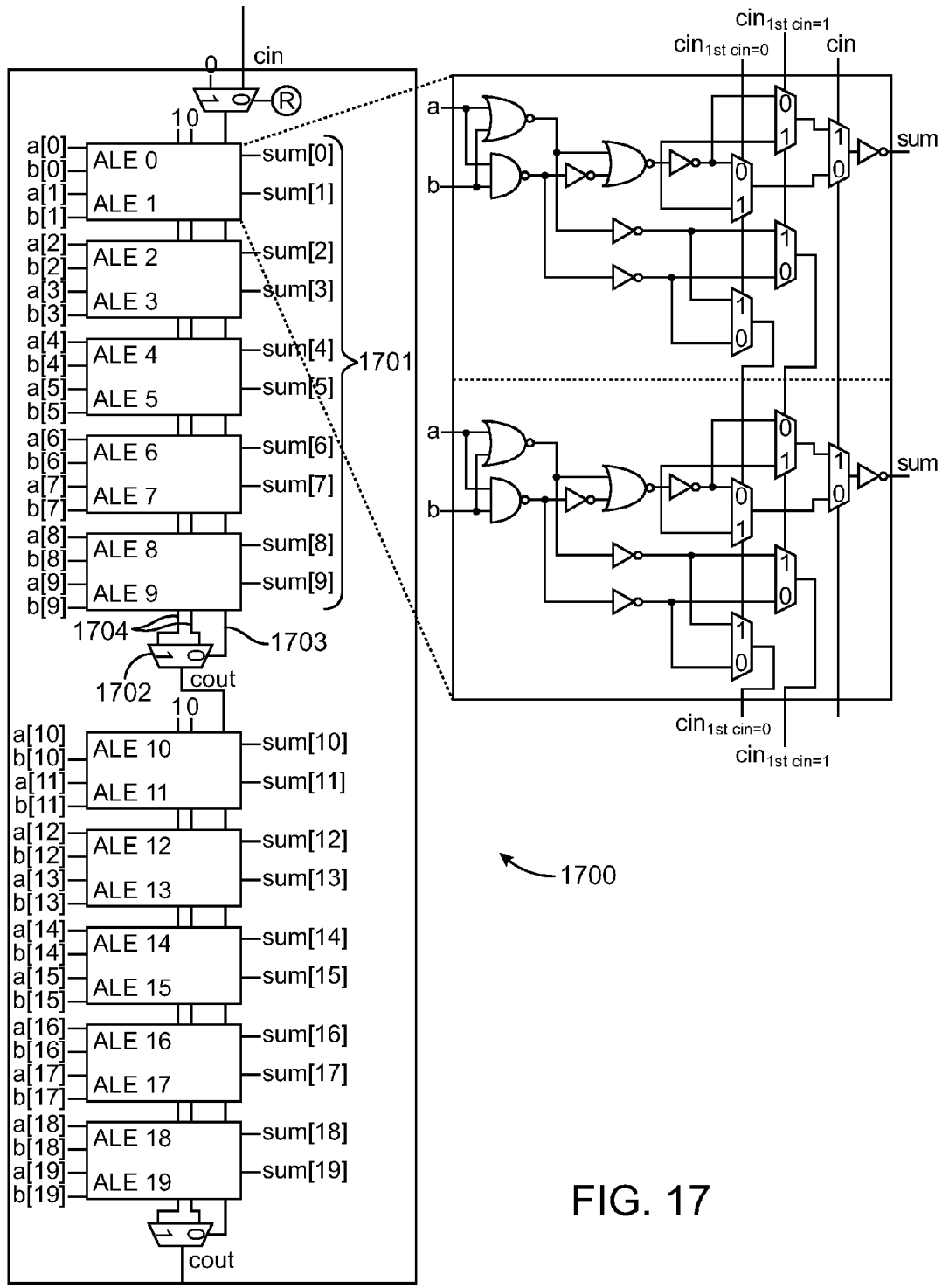
FIG. 17 is a diagram of an illustrative hybrid adder having logic-element-based carry-select adders that are connected in a ripple configuration and that has periodic carry select multiplexer stages that serve respective groups of the logic-element-based carry-select adders in accordance with an embodiment of the present invention.

An illustrative hybrid adder that is combines carry-select and ripple adders is shown in FIG. 17. Hybrid adder 1700 of FIG. 17 has a carry-select on the ALE level which ripples through and additionally has another carry-select stage every 10 bits of addition. This scheme combines features from the ripple-carry adder and the carry-select adder with a carry computation performed every 10 bits of addition. If desired, the speed of the full adder can be increased further by adding inverters onto the carry path as shown on the right hand side of FIG. 17. The carry out signals are no longer inverted in this scheme.

In hybrid adder 1700, each logic element (ALE) contains a carry-select adder. These carry-select adders are connected in a ripple configuration, as indicated by, for example, the configuration of adders 1701. The carry in signal on line 1703 forms a control input to carry select multiplexer 1702. The carry in signal on line 1703 (which is associated with carry-select adders 1701 in the FIG. 17 example) is received from the output of the multiplexer in the top of hybrid adder 1700 and selects between a "0" signal (start of new adder) and a "Cin" signal (continuation of adder circuitry from another logical array block). The carry in signal on line 1703 serves as a carry select control signal for multiplexer 1702. Multiplexer 1702 selects an appropriate carry signal to route to its output from carry input lines 1704 based on the value of the carry select signal on line 1703. As shown on the left side of FIG. 17, this configuration may be repeated more than once to handle large input words.

If desired, configurable hybrid adder circuitry can be formed in a block of digital signal processing (DSP) circuitry on a programmable integrated circuit 10, as part of a hard-wired adder circuit block on a programmable integrated circuit 10, or in other suitable circuit blocks.

The foregoing is merely illustrative of the principles of this invention and various modifications can be made by those skilled in the art without departing from the scope and spirit of the invention.

What is claimed is:

1. Hybrid adder circuitry comprising:
    a plurality of carry-select adders that produce sum signals from two input words, wherein the carry-select adders each produce at least one carry signal based on a carry input signal;
    a plurality of carry look-ahead units, each carry look-ahead unit receiving propagate and generate signals from a respective one of the plurality of carry-select adders and each producing output signals; and
    a carry computation unit that receives the output signals from each of the carry look-ahead units and that produces a carry output signal, wherein the sum signals from the carry-select adders and the carry output signal from the carry computation unit form an arithmetic sum of the two input words.

2. The hybrid adder circuitry defined in claim 1 wherein the carry-select adders each have adder circuits each having a single output multiplexer that produces a sum signal in response to a carry input signal that serves as a carry select control signal for the multiplexer.

3. The hybrid adder circuitry defined in claim 1 wherein the carry select adders each comprise a plurality of logic element adder circuits, wherein each logic element adder circuit includes three half-adder-type circuits, and wherein a first of the three half-adder-type circuits in each logic element adder circuit produces the generate signals.

4. The hybrid adder circuitry defined in claim 3 wherein the first half-adder-type circuit and a second of the three half-adder-type circuits in each logic element adder circuit forms a first full adder and wherein the first half-adder-type circuit and a third of the three half-adder-type circuits in each logic element adder circuit forms a second full adder.

5. The hybrid adder circuitry defined in claim 1 wherein each carry select adder performs addition on at least four bits of the input words.

6. The hybrid adder circuitry defined in claim 1 wherein the carry select adders each have a carry in input and each have a sum output.

7. The hybrid adder circuitry defined in claim 1, the carry-select adders each comprising:
    a first output multiplexer that produces a respective one of the sum signals based on the carry input signal; and
    a second output multiplexer that produces the at least one carry signal based on the carry input signal.

8. The hybrid adder circuitry defined in claim 1 wherein each of the carry-select adders comprise adder circuits that are connected in a ripple configuration and produce first and second carry signals for that carry-select adder.

9. The hybrid adder circuitry defined in claim 8 further comprising:
    a carry-select multiplexer interposed between first and second carry-select adders of the plurality of carry-select adders, wherein the carry-select multiplexer receives the first and second carry signals of the first carry-select adder and routes a selected one of the first and second carry signals of the first carry-select adder to the second carry-select adder.

10. The hybrid adder circuitry defined in claim 1, the carry-select adders each comprising:
    an output multiplexer that produces the at least one carry signal based on the carry input signal.

11. Hybrid adder circuitry on an integrated circuit, the hybrid adder circuitry comprising:
    first and second carry-select adders that produce sum, propagate, carry-out, and generate signals from first and second sets of input signals;
    a first carry look-ahead circuit that generates output signals based on the propagate and generate signals from the first carry-select adder;
    a second carry look-ahead circuit that generates output signals based on the propagate and generate signals from the second carry-select adder; and
    a carry computation circuit that produces a carry output signal of the hybrid adder circuitry from the output signals from the first and second carry-look-ahead circuit.

12. The hybrid adder circuitry defined in claim 11 wherein the integrated circuit comprises a programmable integrated circuit.

13. The hybrid adder circuitry defined in claim 12 wherein the first carry-select adder comprises:
    a plurality of adder circuits connected in a ripple configuration.

14. The hybrid adder defined in claim 13 wherein the plurality of adder circuits of the first carry-select adder comprises:
    a first adder circuit that produces a pair of carry signals and a first of the sum signals based on the first and second sets of input signals and a carry input signal; and
    a second adder circuit that produces a second of the sum signals based on the pair of carry signals, the first and second sets of input signals, and the carry input signal.

15. The hybrid adder defined in claim 14 wherein the second adder circuit of the first carry-select adder produces an additional pair of carry signals and wherein the plurality of adder circuits of the first carry-select adder further comprises:
    a third adder circuit that produces a carry output signal of the first carry carry-select adder based on the additional pair of carry signals, the first and second sets of input signals, and the carry input signal.

16. The hybrid adder defined in claim 14 wherein the second adder circuit of the first carry-select adder comprises:
    a first half-adder circuit that produces half-adder propagate and generate signals;
    a second half-adder circuit that produces a first carry signal of the additional pair of carry signals based on the half-adder propagate and generate signals and a first carry signal of the pair of carry signals from the first adder circuit; and
    a third half-adder circuit that produces a second carry signal of the additional pair of carry signals based on the half-adder propagate and generate signals and a second carry signal of the pair of carry signals from the first adder circuit.

17. Hybrid adder circuitry on a programmable logic device that includes a plurality of logic elements each of which has associated combinatorial circuitry and associated register and configurable routing circuitry, comprising:

a plurality of carry-select adders, each located in a respective one of the logic elements, wherein the plurality of carry-select adders are connected in a ripple configuration; and a carry select multiplexer that has carry inputs that receive first and second carry signals from the carry-select adders that are connected in the ripple configuration, wherein the carry select multiplexer has a control input, wherein a carry in signal associated with the carry-select adders in the ripple configuration is applied to the control input of the carry select multiplexer and serves as a carry select signal for the hybrid adder circuitry, wherein the carry-select adders produce the first carry signal for a logic zero carry in signal, and wherein the carry-select adders produce the second carry signal for a logic one carry in signal.

18. The hybrid adder circuitry defined in claim 17 wherein the plurality of carry-select adders receive first and second sets of input signals and produce a plurality of output sum signals for the hybrid adder circuitry, wherein each carry-select adder of the plurality of carry-select adders produces first and second sum signals based on a respective portion of the first and second sets of input signals, and wherein each carry-select adder comprises:

a multiplexer that receives the respective first and second sum signals of that carry-select adder and produces a respective one of the plurality of output sum signals for the hybrid adder circuitry based on the carry in signal.

19. The hybrid adder circuitry defined in claim 18 wherein the plurality of carry-select adders comprises:

a first carry-select adder that produces a pair of carry signals from the first and second sets of input signals; and a second carry-select adder that receives the pair of carry signals of the first carry-select adder and produces the first and second carry signals based on the pair of carry signals and the first and second sets of input signals.

20. The hybrid adder circuitry defined in claim 17 wherein the plurality of carry-select adders comprise a first plurality of carry-select adders and wherein the carry select multiplexer comprises a first carry select multiplexer, the hybrid adder circuitry further comprising:

a second plurality of carry-select adders that receives a first carry out signal from the first carry select multiplexer and produces third and fourth carry signals; and a second carry select multiplexer that produces a second carry out signal based on the first carry out signal and the third and fourth carry signals.

\* \* \* \* \*